United States Patent [19]

Katz et al.

[11] 3,979,057
[45] Sept. 7, 1976.

[54] ELECTRONIC NAVIGATIONAL COMPUTER

[75] Inventors: Ronald Katz, Indian Head Park; Aaron Aronson; Clarence Turek, both of Glenview, all of Ill.

[73] Assignee: Specialized Electronics Corporation, Chicago, Ill.

[22] Filed: Oct. 29, 1974

[21] Appl. No.: 518,728

[52] U.S. Cl. ............................ 235/156; 235/150.26
[51] Int. Cl.² ...................... G06F 15/50; G06F 9/18
[58] Field of Search ................. 235/152, 156, 150.2, 235/150.26; 340/366 F, 379, 172.5

[56] References Cited
UNITED STATES PATENTS

| | | | |
|---|---|---|---|
| 3,308,439 | 3/1967 | Tink et al. | 340/172.5 |
| 3,526,887 | 9/1970 | Erni | 340/379 X |
| 3,573,749 | 4/1971 | Smith et al. | 340/172.5 |
| 3,596,256 | 7/1971 | Alpert et al. | 340/172.5 |
| 3,686,637 | 8/1972 | Zachar et al. | 340/172.5 |
| 3,760,171 | 9/1973 | Wang et al. | 235/156 |
| 3,786,505 | 1/1974 | Rennie | 235/150.26 X |
| 3,816,723 | 6/1974 | Slawson | 340/172.5 X |
| 3,816,731 | 6/1974 | Jennings et al. | 235/156 |
| 3,836,690 | 9/1974 | Purtle | 35/10.2 |
| 3,855,459 | 12/1974 | Hakata | 235/156 X |
| 3,924,111 | 12/1975 | Farris | 235/156 |

*Primary Examiner*—Jerry Smith
*Attorney, Agent, or Firm*—Leydig, Voit, Osann, Mayer & Holt, Ltd.

[57] ABSTRACT

An electronic computer having a limited stored program capability and adapted to perform a plurality of problems particularly useful to aircraft pilots. The unit includes an electronic calculator and a stored program controller for instructing the calculator. The programs stored in the controller cause sequential operation, including the demand for manual entry of necessary data, to calculate a desired result. The calculator includes a plurality of program selector keys operative upon the program controller for selecting the program associated with the desired result. The operating panel further includes a plurality of data entry indicators adapted to be illuminated by the controller for indicating to the operator the nature of each data entry required. The calculator is programmed to solve at least each of the following navigational and performance problems: effects of winds aloft on aircraft progress and maintenance of course, and effect of nonstandard atmospheric conditions on aircraft performance. Additionally, the calculator is adapted to perform program controlled functions involving time related problems characterized by two entry multiplication or division functions. Accordingly, the calculator may be efficiently used in preflight planning to establish a flight plan, and in flight to check progress against the flight plan, the simplified operation requiring minimal operator attention, thereby leaving the pilot free to fly the aircraft.

31 Claims, 4 Drawing Figures

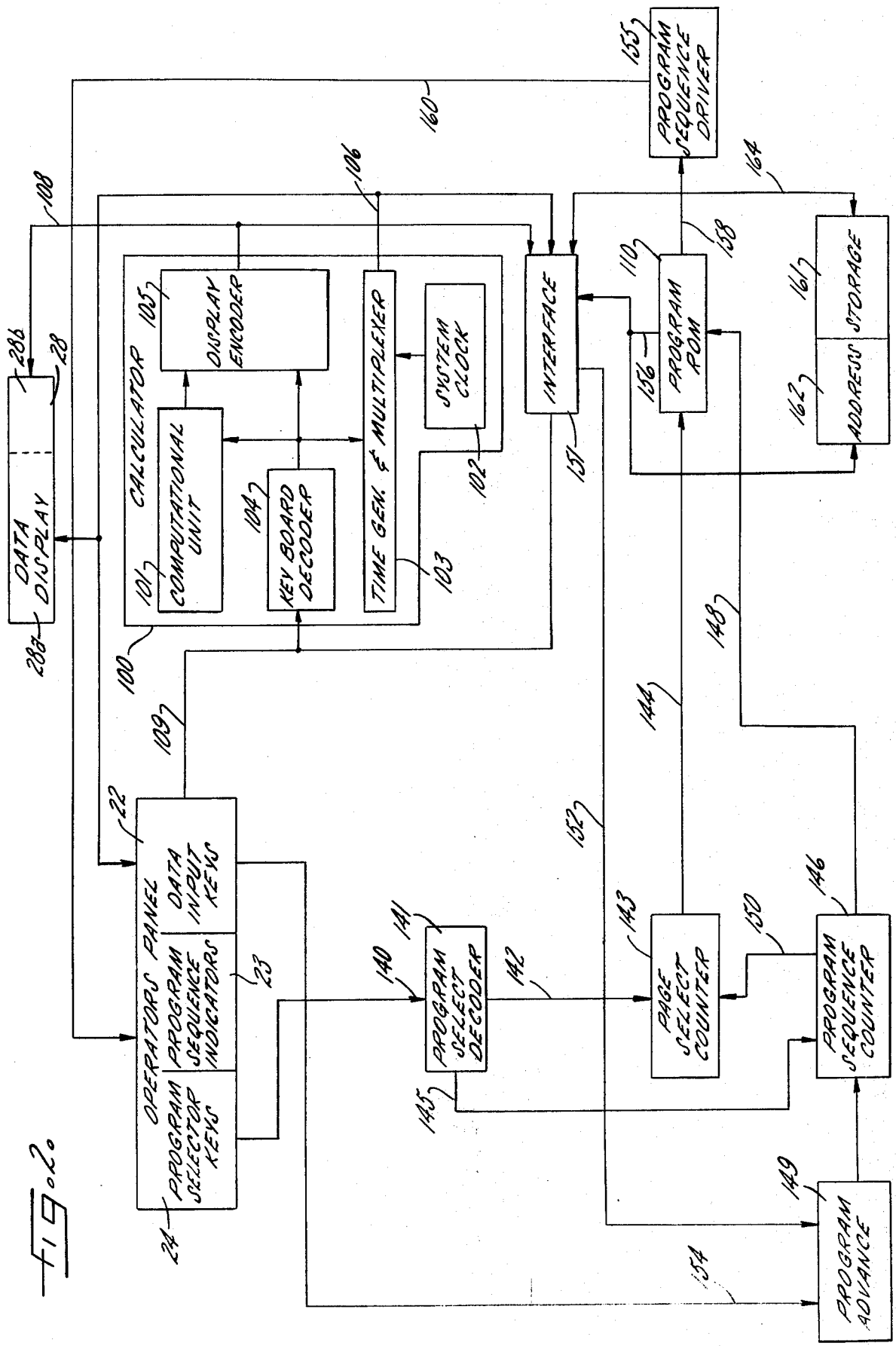

ELECTRONIC NAVIGATIONAL COMPUTER

This invention relates to aircraft navigation, and more particularly, to an electronic computer programed to solve navigational and other flight related aircraft problems.

By way of background, the nature of aircraft navigation and flight plan control requires that pilots perform certain necessary navigational and performance related problems. A typical set of calculations preparatory to filing a flight plan, and in maintaining that plan once in the air, involves the calculation of the effect of winds aloft on the aircraft. While this type of problem will be discussed in more detail below, suffice it to say for the moment that the problem relates the true airspeed and true heading which must be maintained, taking into consideration the wind speed and wind direction aloft in order to follow the selected true course at the projected ground speed. It will be appreciated that such problem is essentially one of vector analysis, requiring either trigonometric or geometric solution.

Other types of commonly encountered problems involve the effect of non-standard atmospheric conditions on aircraft performance. For example, the aircraft altimeter, being a pressure sensitive device, responds to deviations from standard atmospheric conditions (pressure and temperature) and produces an error in the altitude display. Similarly, deviations from standard atomspheric conditions affect the reading of the air speed indicator, and corrections must accordingly be made. Such calculations are generally complex in nature involving multiple operations, and may involve logarithmic or exponential functions.

A final type of problem, simple in nature, involves time and rate relationships, such as those involving speed, time and distance, or time, fuel quantity and rate of fuel consumption.

The prior art includes numerous calculating devices, often termed computers, for solving the above noted aircraft related problems in as efficient a manner as has heretofore been possible. Such "computers"often take the form of a circular celluloid slide rule having multiple scales which may be manipulated to solve the aforementioned problems. It may be said as a generality that such computers are reasonably complicated to use and, as a result, require a considerable amount of operator skill and attention. This factor is further emphasized when it is realized that many pilots required to use such devices fly only infrequently and never achieve the efficiency resulting from continued use. A further deficiency of the above noted "computers" is the fact that they not only require a considerable amount of operator attention, but additionally require the use of both hands, thereby detracting from the ability of the pilot to fly the aircraft.

It might be thought that general purpose scientific type calculators, now generally available, might be used to perform aircraft navigational problems in a simplified manner. While it is certainly possible to solve the necessary problems using a general purpose calculator, such an approach would require the pilot to understand, or at least be familiar with the steps of the mathematics necessary to perform the calculations. As noted above, this would require familiarity with complex trigonometric relationships, the remembering of numerous constants, and the ability to recall the formula for the necessary calculations. As the celluloid type computers described above were developed in order to minimize or eliminate operator familiarity with the underlying mathematics, the general commercial success of such calculators is ample evidence of the drawbacks of such an approach.

With the foregoing in mind, it is a general aim of the present invention to allow aircraft pilots to devote the maximum amount of attention to flying the aircraft while performing required computations during flight by providing a simplified means for performing aircraft related computations. More specifically, it is an object of the present invention to provide a computer having a stored program controller containing a plurality of aircraft related programs, each selectable by an operator, and each adapted to sequence through a series of steps necessary to produce the desired result with a minimum amount of operator attention.

According to an even broader aspect of the invention, it is an object to provide a hand held self powered stored program electronic computer containing a plurality of programs, only certain of the steps of said programs requiring manual input of data, and adapted to accept the input data in the programed sequence, said sequence resulting in the display of the calculated result.

A specific object of the invention is to provide a stored program hand held computer having a plurality of data entry indicators driven by the stored program and operative when a manual data entry is required to indicate the nature of such entry. Thus, it is an aim of the invention to provide such a computer which requires only a minimal amount of operator attention, and no operator knowledge of the specific calculation being performed.

Finally, a detailed object of the invention is to provide a hand held stored program computer having a plurality of internal programs for performing special purpose calculations, and a corresponding plurality of program selector keys accessible to the operator for selecting individual programs to be carried out by the computer.

Other objects and advantages will become apparent from the following detailed description, when taken in conjunction with the drawings, in which:

FIG. 2 is a block diagram illustrating the internal structure of the computer of FIG. 1;

While the invention will be described in connection with a preferred embodiment, it will be understood that there is no intent to limit it to that embodiment. On the contrary, the intent is to cover all alternatives, modifications and equivalents as included within the spirit and scope of the invention as defined by the appended claims.

GENERAL DESCRIPTION OF COMPUTER CAPABILITY AND ORGANIZATION

Figure 1:
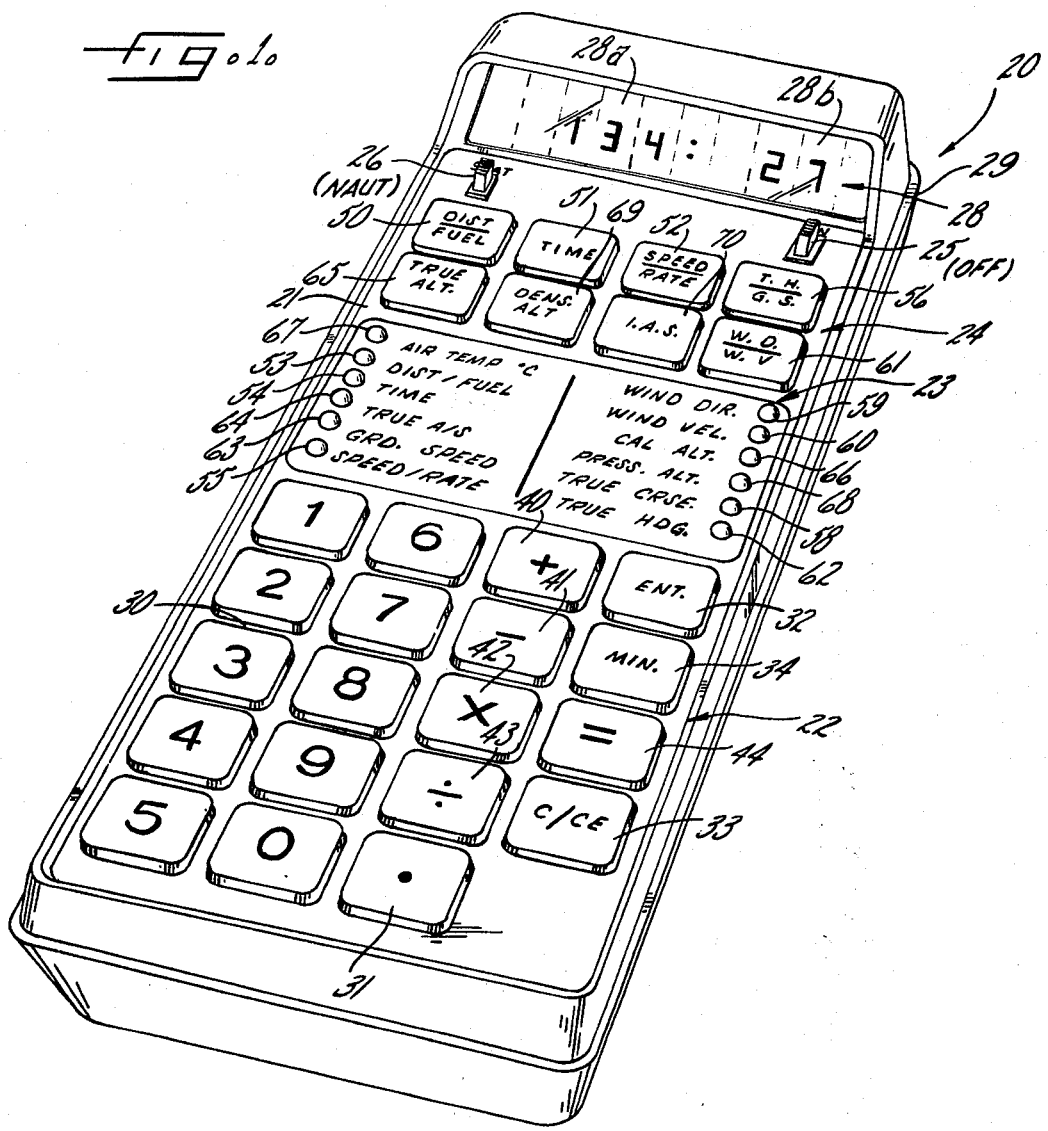
FIG. 1 is a perspective view illustrating a preferred embodiment of a computer constructed in accordance with the present invention.

Turning now to the drawings, FIG. 1 shows the external structure of a computer constructed in accordance with the invention. The computer 20 includes an operator panel 21 which, for convenience, may be broken down into several fields. A first field 22 includes a plurality of data entry buttons including 0 through 9 keys, a decimal key, mathematical operator keys, a clear key, an enter key and a minute key. A second field 23 positioned above the data entry field 22 contains a plurality of indicators, each associated with a particular type of data necessary for the performance of one or more of the stored programs. Finally, a field 24 of program selector buttons is provided for operator selection of a particular program or computation. Completing the operator control panel is an on/off switch 25 adapted to apply power to the unit, and a nautical/statute switch 26 adapted to perform a conversion which will be described in more detail below.

For displaying the results of computations, and for verifying data inputs, a numerical display 28 is provided. Preferably, such display is comprises of a series of light emitting diodes (LED) for displaying results while consuming a minimum of power.

The unit is powered by a self-contained battery pack enclosed in a chamber generally indicated at 29, thereby allowing the unit to be carried and used in any location. The battery pack is preferably provided with nickel cadmium rechargeable batteries.

The particular structure of the elements within the various fields on the operator control panel will now be set forth. The data entry field 22 includes a plurality of keys for allowing the manual entry of data into the computer. An array of numeric keys 30, corresponding to the digits 0 through 9 are provided for entering the basic numeric input data. Concurrently with the depression of the keys 30 for the entry of data, the corresponding numerals will be shown on the numeric display 28. An enter key 32 is provided for terminating a data entry and causing the computer to begin processing of the entered data. A decimal key 31 is provided to operate in conjunction with the numeric keys 30. A clear/clear entry key 33 is provided, operable in the normal mode to clear an erroneous entry or to clear all data previously entered into the computer. Also usable in the normal program mode of operation of the computer is a minute key 34 adapted to allow the entry of time data in nonconsistent units of hours and minutes. As will become more apparent, time data may be entered in such nonconsistent units, the computer performing a calculation to convert the entry to consistent units such as decimal hours. In operation, to accomplish a time entry, an operator depresses the numeric keys 30 corresponding to the number of hours, then depresses the minute key 34, then depresses the numeric keys corresponding to the number of minutes.

According to one feature of the invention, the computer, addition addition to operating in the stored program mode, may be caused to operate as a normal calculator for performing incidental functions. To that end, a series of arithmetic operator keys 40-43 comprising keys related to addition, subtraction, multiplication and division and a corresponding result demanding key, illustrated as equals key 44 are provided. The noted keys allow the computer to perform as a calculator by merely beginning a sequence of operations not involving the initial depression of a program selector key. The operator simply depresses a key within the numeric field 30 for entry of a number, depresses one of the keys 40 through 43 for indicating the operation desired, and depresses further of the numeric keys 30 for entry of a second number. Calculations may be chained, if desired, or an immediate result demanded by depression of the equals key 44. As will be noted below, this feature is convenient in a navigational computer as it allows the operator to simply calculate the weights and balances of the aircraft before take-off to assure that the aircraft load is not excessive and is properly balanced.

Turning now to the program selector buttons within the field 24, there is seen an array of eight keys similar to those contained in the data input field. As will become more apparent, the keys are each related to associated aircraft related problems, and are adapted to initiate one of the stored programs for calculating a desired result. The keys are preferably labeled in a result oriented fashion, thereby allowing an operator to select the needed program by depression of a button labeled with the result desired.

Keys 50, 51 and 52 labeled distance/fuel, time and speed/rate respectively, are associated with time related problems involving two entry multiplication or division functions. More specifically, the problem contemplated by the three keys involve the interrelationship of the following factors: speed, time and distance or rate of fuel consumption, time and fuel quantity. It is seen that each of these factors are related by a ratio, in each case the rate variable being equal to the magnitude variable divided by the time variable. Accordingly, key 50 may be considered the program selector to calculate the magnitude, key 51 the program selector to calculate time and key 52 the program selector to calculate rate.

According to an important aspect of the invention, depression of one of the program selector keys serves to illuminate one or more of the data entry indicators during portions of the program when input of numeric data is required. Limiting consideration for the moment to the time related problems noted above, it is seen that there are three indicators within the field 23 bearing identical legends to the program selector keys, namely indicators 53 (distance/fuel), 54 (time) and 55 (speed/rate). To functionally illustrate the program guidance feature of the stored program computer in this simplified problem, assume that it is desired to calculate the average ground speed during a completed leg of the flight. Depression of the speed/rate program selector 52 initiates a program within the computer which illuminates the distance/fuel indicator 53. Viewing this, the operator is appraised to enter data via the numeric keyboard corresponding to the distance between check points on the leg of the flight just completed. Depression of the proper numeric keys followed by depression of the enter button 32 enters that data into the computer where subsequent program steps route the data to the proper location. The computer then illuminates the time indicator 54, appraising the operator to enter the elapsed time for the previous leg of the flight. Doing so, followed by depression of the enter button 32, causes the computer to continue to sequence ultimately showing on the display 28 the results of the calculation.

Turning now to a more complex problem, and more specifically to a navigational problem involving the effect of wind aloft on aircraft performance and maintenance of course, there is shown a program selector key 56 adapted to initiate a program for calculating the dual result of true heading and ground speed. This problem may be considered to be one of vector analysis, relating the effect of the wind vector upon the vector repesenting the heading and air speed of the aircraft to arrive at the vector representing the true course and ground speed desired. While the problem will be considered in more detail below, suffice it to say for the moment that the program is adapted to accept four of the known entries in a predetermined programed sequence to calculate and display the desired results. In operation, depression of true heading and ground speed program selector 56 initiates a program which illuminates the true course indicator 58. Accordingly the operator responds by depressing the proper numeric keys 30 followed by the depression of the enter button 32. The program then manipulates the data in a manner to be described below and subsequently illuminates the wind direction inidicator 59. Entry of the required data followed by further programmed manipulations and calculations causes the program to sequence to a step adapted to illuminate the wind velocity indicator 60. Following the entry of the required data, the program continues sequencing finally illuminating the true air speed indicator 64. Again, the operator is appraised to enter the proper data, and having done so allows the program to continue sequencing to calculate the desired results. It is noted that this problem yields a two-part result comprising true heading and ground speed. The display 28 is particularly suited to display such result as it is segmented to include a first portion 28a and a second portion 28b. As will be described in more detail below, the output display driver is adapted to display the ground speed in the first or five digit segment 28a and the heading in the second or three digit segment 28b.

The wind triangle problem set forth above may also be advantageously solved to determine the direction and velocity of an unknown wind in response to the entry of the remaining four known variables. Accordingly, a wind direction/wind velocity program selector 61 is provided, operation of which initiates a program similar to that initiated by program selector 56 but involving a different sequence and series of calculations to solve for the unknown wind factor. It will be briefly noted that the sequence of data entry required by such program involves the sequential illumination (interspersed with the necessary manipulations and calculations) of the following indicators: true heading 62, true course 58, true air speed 64 and ground speed 63. The computation yields a two result answer which may be advantageously displayed on a split screen as set forth above.

Further problems adapted to be selected by the program selector keys within the field 24 for initiating programs stored within the computer comprise navigational and performance problems involving the effect of non-standard atmospheric conditions on aircraft performance. As a generality, it can be said that these calculations involve corrections of readings obtained from the aircraft airspeed indicator and altimeter necessitated by deviations from standard atmospheric pressure and temperature.

By way of background, a series of altitude related terms have acquired specific meaning within the navigational field. In order to more fully understand the import of the capabilities of the electronic computer, the following simplified definitions will prove helpful: pressure altitude is the reading of an aircraft altimeter with the associated barometric adjustment beng set at the standard sea level pressure of 29.92 inches of mercury. By way of contrast, calibrated altitude may be considered the altimeter reading corrected for installation error with the barometric adjustment set at the pressure of the datum plane over which the aircraft is actually flying. Density altitude is a term referring to pressure altitude corrected for variations from the standard temperature. True altitude, the actual vertical distance above sea level, is the altimeter reading corrected for both pressure and temperature variations from standard conditions.

Turning again to FIG. 1, it is seen that there is a program selector key 65 for initiating a program adapted to calculate true altitude. The specific nature of the calculation performed will be set forth in more detail below. However, it may be generally said that the program performs a sequence of steps involving both manipulation and calculation as well as the manual input of data. As a result, the program as it appears to an operator of the computer involves the followng sequence after the initial depression of the true altitude button 65. The computer will illuminate the air temperature indicator 67. In response thereto, the pilot will read the aircraft thermometer and insert the necessary data via the numeric field 30. The program will continue sequencing and illuminate the pressure altitude indicator 68, informing the pilot to adjust the barometric adjustment in the altimeter to standard sea level conditions, read the altimeter and insert the data via the numeric field 30. The calibrated altitude indicator 66 will then be illuminated, informing the operator to key-in via the numeric keys 30 the altimeter reading with the barometric adjustment set at actual pressure. Continued sequencing of the program will result in the calculation of true altitude, and the display thereof on the numeric display 28.

Depression of the density altitude program selector key 69 results in the initiation of another correction program which, to the operator appears as the initial illumination of the air temperature indicator 67 followed by the manual entry of data, the illumination of the pressure altitude indicator 68 followed by the entry of data, and the display of the density altitude on the readout 28.

A final program selector key 70 is used to calculate indicated airspeed. The program is similar to those set forth just above in that it involves a correction to an aircraft instrument necessitated by conditions varying from the standard. In short, the airspeed indicator will produce an error when the aircraft is flying in nonstandard temperatures and pressures. Accordingly, in order to maintain the filed flight plan, and the true airspeed filed therewith, the pilot must make corrections to the desired true airspeed for the actual temperature and pressure in order to determine a target indicated airspeed for maintaining the flight plan. Depression of the indicated airspeed program selector 70 results in a sequence for illuminating the following data input indicators, said sequence of course being interspersed with the necessary manipulations and calculations to produce the desired results: air temperature indicator 67, pressure altitude indicator 68 and true airspeed indicator 64. The result displayed, indicated airspeed, will guide the pilot in flying the plane at an indicated speed which will produce the desired true airspeed.

Computer Details

With a general understanding of the purpose and function of the computer 20 derived from the foregoing, attention will now be focused upon the internal structure of the computer necessary to produce the above described results. It should be noted however, at this point that the operating procedure outlined above may be considered a decided advantage over previously available slide rule type "computers". More specifically, the programed sequence of calculations in conjunction with the data input indicator allows the computation of desired results with a minimum amount of operator attention. The operator need not remember the mathematics involved, nor even remember the sequence of data inputs, being guided through the entire program, once the program is initiated. Additionally, the computer may be provided with a strap or band (not shown) so that the case may be affixed to the leg of a pilot, thereby allowing all calculations to be performed with one hand. It is apparent that the computer allows the pilot to devote maximum attention to flying the aircraft.

Calculator Circuit and Related Components

Turning now to FIG. 2, there is shown a block diagram illustrating the internal structure of a computer capable of operation in the mode described above. For performing the necessary mathematical calculations and manipulations, calculator means are provided, shown herein as an electronic calculator circuit 100. In the exemplary embodiment, the calculator means is implemented using commercially available scientific calculator arrays produced by Mostechnology, Inc. of Morristown, Pennsylvania, and identified by the part numbers MPS 2525-001 and MPS 2526-001. The structure and operation of the calculator means is fully described in a publication available from Mostechnology entitled "Specification for Scientific Calculator Arrays MPS 2525-001, MPS 2526-001", the second revision of which is dated Jan. 7, 1974. However, for an understanding of the invention, the following brief description will suffice.

The calculator 100 includes a computational unit 101 adapted to perform the arithmatic operations of addition, subtraction, multiplication and division, as well as trigonometric, exponential, logarithmic and reciprocal functions. The capabilities of the computational unit 101 within the calculator means 100 will be more fully appreciated with reference to the exemplary programs set forth below. The calculator 100 further comprises a system clock 102 driving a time generator and multiplexer 103 adapted to control the interactions between the units of the calculator 100 and also the external components. Completing the illustrated components of the calculator 100 are a keyboard decoder 104 and a display encoder 105. The arrows interconnecting the internal units show the general data flow as well as the overall organization of the calculator means.

The input/output structure of the calculator comprises a matrix arrangement which is time dependent under the control of the system clock 102. First and second matrices having one common axis emanate from the calculator means 100 to form respective intersections at the data input keys 22 and the data display 28 respectively. The common axis for the two matrices comprises output lines 106 coupled to the data display and data input keys in parallel as shown. The illustrated line 106 comprises 14 individual wires driven by time generator and multiplexer 103. The time generator and multiplexer is adapted to provide pulses on the respective lines in sequence thereby to sequentially activate each line. A series of 8 output lines, illustrated as line 108 couple the display encoder 105 to the data display 28. The lines 106 and 108 form a matrix at the data display for sequentially driving each of the digits to show the numerals selected by lines 108.

A series of 4 input lines, illustrated as line 109 couple the data input keys 22 of the keyboard to the keyboard decoder 104 of the calculator 100. The lines 109 form the second axis of the keyboard matrix and are adapted to provide inputs to the calculator indicating the identity of any depressed key thereon. The keys within the keyboard are arranged at intersections of the matrix so that the particular time relationship of a pulse as determined by one of the 14 lines 106 appearing on one of the input lines 109 identifies a particular key, thereby allowing the calculator to respond to such key.

Program Control and Selection Components

According to an important aspect of the invention, a program director including a pre-programmed dedicated memory is provided for controlling the overall operation of the computer, shown herein as program memory ROM 110. The ROM is arranged as a cubic array for storing a series of instructions in sequential locations necessary to perform each of the programs within the repertoire of the computer.

Figure 3:
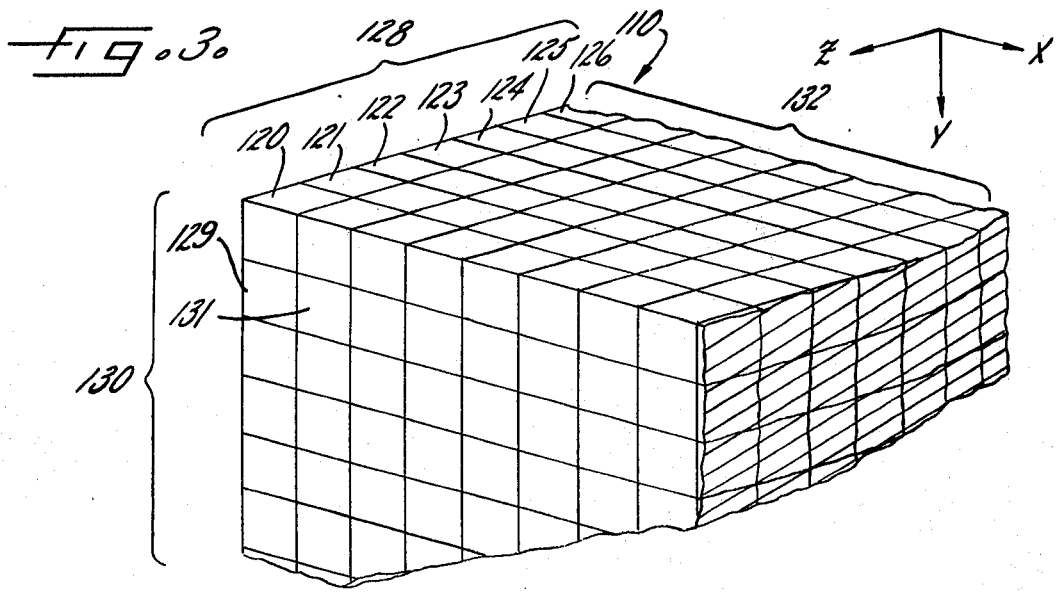
FIG. 3 is a diagram illustrating the structure of a program memory.

Turning briefly to FIG. 3, the cubic structure of the ROM will be illustrated, such structure forming a book comprised of individual pages, words and bits. It is seen that the ROm structure is comprised of individual cubes arranged in a stacked configuration, each cube representing one memory bit. A series of cubes or bits 120 through 126 are stacked along the Z-axis as illustrated to form a single memory word generally indicated at 128. Similarly, a series of words 128, 129, etc. are stacked along the Y-axis to form a single memory page 130. In like manner, a series of individual pages 130, 131, etc. are stacked along the X-axis comprising the ROM memory book 132. While the particular memory structure illustrated in FIG. 3 is not essential in practicing the invention, such structure makes the addressing techniques for controlling and sequencing the ROM more convenient.

In practicing the invention, the programs within the repertoire of the calculator, comprised of a series of sequential steps are stored in the ROM 110. A single word within the memory, such as word 128 is dedicated to each of the program steps, sequential instructions being stored in adjacent words on a page to form a complete routine. In order to simplify addressing, it is preferable that the first step of each program be stored as the initial word on an associated page. In the event a program contains more steps than there are words on a page, successive pages may be used. The individual bit lines emanating from the ROm are connected to the interfacing means and the program sequence indicators, as will be described below, so that the bit condition within an addressed word in the ROM will control the interface and sequence indicator.

Turning again to FIG. 2, the means for selecting the individual programs within the ROM will now be set forth. As noted with reference to FIG. 1, in practicing the invention, a plurality of program selector keys 24 are provided on the operator's panel of the computer. The 8 keys illustrated in FIG. 1 are coupled via connection 140, which actually comprises 8 individual lines, to a program select decoder 141. The decoder 141, upon the detection of the actuation of one of the program selector keys performs a dual function. The decoder recognizes which of the keys has been actuated, and in response thereto couples the unique address of the selected program onto four address lines illustrated as interconnection 142. As a result, a page select counter 143, receiving the address information is adapted to couple a signal onto the four address lines illustrated by interconnection 144 to select the initial page in the ROM 110 on which the selected program is stored. Simultaneously with the selection process, the program select decoder produces a pulsed signal on line 145 which is coupled to a program sequence counter 146, and adapted to reset the counter. Four address lines, illustrated as interconnection 148 coupling the program sequence counter to the program ROM are adapted to select individual words within the page selected by the page select counter 143. As the program sequence counter 146 has been reset by the signal provided by the program select decoder 141, the first word in the selected page is addressed, thereby addressing the first instruction in the selected program. For sequencing through the individual steps of a selected program, a program advance module 149 is provided. Such module may comprise a timing circuit adapted to establish the overall program timing of the computer, such time being sufficient to allow the calculator means 100 to perform the necessary operation between successive advances of the major program clock. The program advance module 149 is activated upon the initiation of a program to clock the program sequence counter 146 at a preset rate. Accordingly the address on output lines 148 is advanced in a binary fashion, while the address on lines 144 is maintained constant in order to sequentially address the respective step storing words in the selected page of the program ROM 110. In the event a program comprises more steps than words in a page, the program steps may be stored on sequential pages. To accomodate such a situation, the program sequence counter 146 is coupled to the page select counter 143 by means of interconnection 150. Such interconnection allows the program sequence counter, having reached the limit of its count to increment the page select counter 143 while resequencing to a zero count within the program sequence counter 146. Accordingly, the program is sequenced to the first word in the next sequential page thereby allowing the stored program to continue.

As will become more apparent, certain of the steps stored in the program ROM 110 required the manual entry of data via the data input keys 22. In order to allow for such data entry, the program advance module 149 must be disabled for a time sufficient to enter the data. To accomplish this result, the CPU interface 151, which will be described in more detail below, is interconnected to the program advance module 149 by a line 152. Such line is activated in the event the program ROM 110 sequences to a step requiring the manual input of data; and is effective to disable the program advance module 149, thereby preventing further program sequencing. As noted above, a data entry is performed by actuating the proper numerical keys within the keyboard 22 followed by a depression of the enter key. A connection 154 coupling the keyboard 22 to the program advance module responds to the depression of the enter key to re-enable the program advance module 149 to allow the program to continue after the entry of the necessary data.

Having thus described the sequencing of the program ROM 110, attention will now be directed to the outputs from the ROM which are adapted to act upon interface 151 to control the calculator means and also to act upon the program sequence driver 155 to control the program sequence indicators 23 which form part of the operator's panel of the computer. As illustrated, a series of output lines indicated as interconnection 156 couple the program ROM to the interface, and a second series of output lines illustrated as interconnection 158 couples the program ROM to the program sequence driver. In the illustrated embodiment, the output lines of the ROM are segregated to form the grouped interconnections 156, 158, thereby allowing certain bits within each memory word to control the interface while dedicating other bits within each word to control the sequence indicators. For example, the output lines which are addressably driven by the bits of each word corresponding to illustrated bits 120 through 123 may comprise the sequence control lines 158 while the output lines from the remaining bits illustrated as bits 124, etc. may comprise the interface driving lines 156. It will therefore be apparent that coupling the proper 8 bit address to the program ROM, via the 4 bit page address on lines 144 and the 4 bit word address on lines 148 will transfer control of each of the output lines 156 through 158 to associated addressed bits for readout of the instruction contained therein.

The interface 151 responds to the instructions on lines 156 to cause the calculator means 100 to perform the calculation or manipulation contemplated by the particular instruction provided by the ROM 110. In effect, the interface 151 "pushes the buttons" of the calculator, causing it to manipulate data and perform calculations. Such operation will be more fully appreciated with reference to the program example given below. As noted with reference to the operation of the keyboard 22, and the description of the timed matrix arrangement for entering data and instructing the calculator, the computer is controlled by a 14 × 4 timed matrix arrangement. Additionally, the 4 lines forming the second axis of the input matrix are coupled to the interface in parallel fashion as illustrated. Accordingly, the interface internal circuitry is adapted to cross points within the matrix provided thereto to cause the calculator to perform any operation which might normally have been caused via the keyboard. However, in accordance with the invention, such points are crossed in response to the instruction received on lines 156, thereby providing the program ROM with the complete capability to control the calculator.

Illuminated Program Sequence Indicators

In practicing the invention, the program ROM 110 not only acts through the interface 151 to control the calculator 100, but also causes the illumination of the program sequence indicators to appraise the operator of the need for a manual data entry and the nature of the entry required. In the exemplary embodiment, such function is accomplished under the control of output lines 158 coupling the program sequence driver 155 to the program ROM 110. In one embodiment, the lines 158 carry a BCD address for selectively illuminating individual ones of the program sequence indicators on the operator control panel. The program sequence driver 155 then comprises a one of 16 decoder and the necessary drivers for decoding the address on lines 158 and driving the addressed indicator via one of the 12 lines illustrated as interconnection 160. It will be appreciated that the lines 158 are normally maintained in an inactive condition thereby preventing the illumination of any of the indicators, such lines being energized only in conjunction with a program step requiring the manual entry of data.

Intermediate Data and Program Storage Elements

According to one aspect of the invention, the amount of the attention and effort required by the pilot in utilizing the calculator is minimized by temporarily storing entered data or intermediate results thereby to minimize the number of required data entries. A first easily accessible memory means is provided by the calculator 100 itself. Memory is accessed in a straightforward manner with simple store or retrieve instruction contained in the proper instruction steps in the program ROM coupled to the calculator by means of the interface. In the illustrated calculator, however, only a single storage register is provided. As will become more apparent, certain of the programs require storage of two or more words of data simultaneously during the program sequence. Accordingly, additional temporary storage is provided by supplementary storage register 161 having an associated address generator 162. As illustrated in the drawing, the address generator 162 is coupled to the program ROM 110 via lines 156 in parallel with the interface 151. Accordingly, certain of the program steps are adapted to set or select an address within address register 162. Input and output to temporary storage is provided by lines 164 coupling the interface 151 to the storage register 161. Interconnections 164 may efficiently comprise 4 lines for transferring BCD digits between the interface and storage elements. It will be appreciated, however, that data normally transmitted to the calculator is in the time related matrix format described above, while data to be stored in a temporary storage must be provided in some non time related code such as BCD. Accordingly, the interface 151 is provided with means for decoding the output of the calculator which is in time related matrix format and producing a BCD representation thereof for coupling to the storage 161. To that end, the display encoder 105 within the calculator 100, which it is recalled controls one axis of the data display matrix, is also coupled to the interface. Accordingly, circuitry within the interface acts in a similar fashion to the display to accept output data from the calculator. Such accepted output data is encoded in BCD and coupled to the storage 161. In a similar fashion, data read from the storage 161 to the interface 151 is in BCD format, the interface, in conjunction with the timed signals received on lines 106 is adapted to produce the proper signals on lines 109 (the second axis of the input matrix) for communicating with the calculator in input data format. Thus, according to this aspect of the invention, the interface acts similarly to the display in receiving data from the calculator, and similarly to the keyboard for coupling data to the calculator.

Result Display Circuits

It was noted above, with reference to the description of FIG. 1, that certain of the programs stored within the program director 110 provide a dual result, and that the data display 28 was segmented into sections 28a and 28b to simultaneously display both results. The illustrative circuitry provides several means for accomplishing this split screen display function. Initially, it should be noted that the illustrated calculator chip 100 has the capability to calculate in and display scientific notation. This feature may be used to display the two-part result by controlling the calculator via the stored program and interface means to treat the first result as a mantissa and the second result as an exponent thereby causing the simultaneous display of both results. It is noted, however, that this technique is limited and that the calculator may only display a two digit exponent. As a result, other techniques must be used when both of the results in a dual result problem are larger than two digits.

A second technique, which will be described in conjunction with a second result of three digit maximum magnitude (comparable with the display of heading) contemplate a program of simple calculation for assembling the dual result into a unitary data word. Program steps exemplifying this technique would involve temporarily storing the second result in memory, operating upon the first result to multiply it by 1000, retrieving the second result from memory and adding it to the multiplied first result, and causing the display of the sum.

A final technique, which as all the others is under the control of the stored program, involves the temporary storage of both results in supplementary storage memory 161 in locations controlled by the steps stored in the program director 110. Having stored both results, the program director 110 then causes the sequential readout of those results into the interface 151 and thereby into the calculator 100 in such an order as to assemble a composite data word for display containing both results.

Finally, it was noted when describing FIG. 1 that the computer had the capability to perform as a normal calculator when not using the programed mode of operation. It will be appreciated that this function is implemented in the block diagram of FIG. 2 using the normal keyboard matrix coupling the keyboard 22 and calculator 100 via and first axis line 106 and the second axis input lines 109. It is presently contemplated that sufficient flexibility will be achieved by providing the addition, subtraction, multiplication and division functions described with reference to FIG. 1. However, it should be noted that further features, extending to the full capabilities of the calculator may be achieved by providing additional keys at the necessary matrix cross point.

Flow Chart

Figure 4:
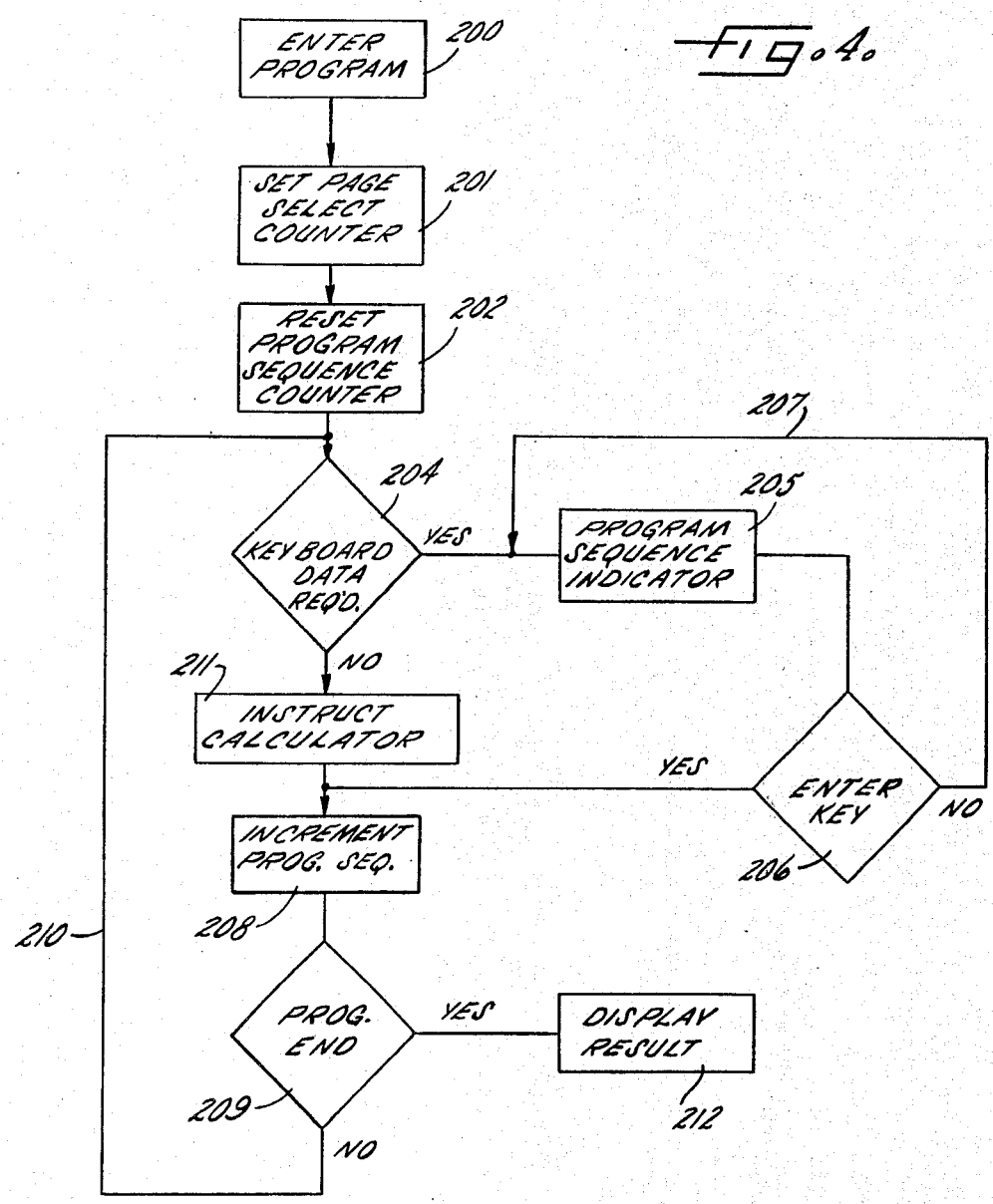
FIG. 4 is a flow diagram illustrating the general sequencing of the stored program controller.

Turning now to FIG. 4, there is shown a flow chart generally describing the manner in which the elements described in FIG. 2 are sequenced to carry out the stored programs. A program is initiated in block 200 of the flow chart, simulating the depression or actuation of one of the program selector keys 24. In response thereto, a set page select counter operation is performed to cause the page select counter 143 to produce the four bit address on lines 144 for selecting the first page in the program storage ROM 110 at which the selected program is located. Subsequently thereto, or simultaneously therewith if desired, a reset program sequence counter operation 202 is performed to reset the program sequence counter 146 thereby addressing the first word on the selected page of the program as has been described heretofore. Having thus conditioned the circuit for executing the selected program, a test operation 204 is performed to determine from the message stored in the first word of the program whether a keyboard data entry is required. Assuming that the test operation 204 determines that keyboard data is required, the proper one of the program sequence indicators is driven or illuminated in step 205. Having accomplished this a continual testing loop 206 is set up to test for the depression of the enter key indicating that the required data has been entered by the operator. Before detecting the actuation of the enter key, the result of the test operation 206 is no, activating the loop indicated at 207 to maintain the selected program sequence indicator in its illuminated condition. Upon the manual actuation of the enter key, the result of test operation 206 is yes, exiting from the loop 207 and sequencing the program to operation 208 causing the program sequence counter to be incremented. Thus, the program was temporarily halted while awaiting entry of the necessary data. Having received the data, the program advance counter 149 increments the program sequence counter 146 to address the next sequential word in the page of instructions within the program director 110. Having thus incremented the program to the next step, a test operation 209 is performed to determine, from the condition of the addressed instruction, whether the program is at an end. Assuming the test operation 209 results in a now answer, an operation loop 210 is energized to again perform the test 204 to determine if keyboard data is required. Assuming that the result of test 204 is a no answer, an instruct calculator operation 211 is performed, causing the instructions stored in the addressed step of the program director 110 to act through the interface 151 to "operate the keys of the calculator". As will be more fully described below, such operation may include the performance of mathematical operations within the repertoire of the calculator, the storage or retrieval from memory, and the input of data or stored constants. The program then continues to ste 208 to increment the program sequence counter to address the following sequential instruction word. Operations continue in the same manner, being controlled by the test instructions 204 and 209 until the programmed result is calculated causing a yes answer to test 209. In response to such yes answer, step 212 is executed causing the display of the calculated results.

Illustrative Programs for Specific Calculations

Certain programs stored within the program director 110 will now be described by way of a statement of the mathematical relationship solved by each of the programs and the resulting operation of the program sequence indicators responding thereto.

The first of the program selector keys, distance/fuel key 50 initiates a program for solving the following functions:

$$\text{Dist} = (\text{Speed}) \times (\text{Time}) \text{ or } (\text{Fuel}) = (\text{Rate}) \times (\text{Time})$$

In this first, simplified program the nature of the units is self-explanatory, the program being adapted to calculate a quantity factor by relating a rate factor and a time factor. Upon depressing the distance/fuel program selector key 50 the computer would cause the following program sequence indicators to be illuminated in the stated sequence: speed/rate 55 and time 54. In each of the problems described herein, it is assumed that in response to the illumination of a program sequence indicator, the operator enters the proper data via the numeric keys 30 and signifies the entry by actuation of the enter key 32. Such operation allows the program to continue sequencing as described above to perform the calculation and demand new data where required by illuminating the next program sequence indicator. Also, the fact that the result is displayed at the end of each problem will not be restated for each program.

Such calculation might be used, for example, to compute the fuel requirements for a particular flight or to compute the distance available (range) for a given ground speed and flying time available.

The time program selector key 51 initiates a problem involving the same variables which may be stated as:

$$\text{Time} = \frac{\text{Dist.}}{\text{Speed}} \text{ or } \text{Time} = \frac{\text{Fuel}}{\text{Rate}}$$

Such computation might be used to compute flying time available from a known amount of fuel on board and a given fuel consumption rate. The program might also be used to calculate time enroute using the total distance derived from the aeronautical chart and the estimated ground speed filed with the flight plan. The program, in addition to calculating the result causes the following sequence of illumination of program indicators: distance/fuel 53 and speed/rate 55.

A final manipulation of the same three variables is accomplished by the program responsive to the speed/rate program selector key 52. The statement of the problem solved is as follows:

$$\text{Speed} = \frac{\text{Dist.}}{\text{Time}} \text{ or } \text{Rate} = \frac{\text{Fuel}}{\text{Time}}$$

The sequence of illumination of program indicators is distance/fuel indicator 53 followed by time indicator 54. The program is useful in computing the average ground speed from the known distance between checkpoints and the elapsed time between such checkpoints. Similarly, the rate of fuel consumption may be computed knowing the amount of fuel consumed in the time during which such consumption occurred.

The true heading/ground speed program selector key 56 initiates a program for calculating a pair of results according to the following relationships:

$$TH = -[\arcsin \frac{WS \sin (TC-WD)}{TAS}] + TC$$

where
TH = True Heading
WS = Wind Speed
TC = True Course
WD = Wind Direction (as reported)
TAS = True Air Speed and $$GS = TAS \cos \gamma_1 - WS \cos \gamma_2$$

where, in addition to the above
GS = Ground Speed
$\gamma_2 = TC - WD$ (calculated above)

$$\gamma_1 = -[\arcsin \frac{WS \sin (TC-WD)}{TAS}] \text{ (calculated above)}$$

The program, while performing the calculations set forth, causes the illumination of the program indicators in the following sequence at the points demanded in the program: true course 58, wind direction 59, wind speed 60 and true air speed 64. In addition to demonstrating a more complex problem using the trigonometric capabilities of the calculator, it is also seen that all of the inputs are entered while calculating true heading, the ground speed calculation making use of the memories provided to automatically calculate the second result. The program is a necessary one used by pilots in filing a flight plan.

The true altitude selector key 65 initiates a program for performing the following calculation:

$$TA = \frac{(273 + AT\ °C) \times CA}{288 + (-.00198 \times PA)}$$

where
TA = True Altitude
AT °C = Air Temperature in °C
CA = Calibrated Altitude
PA = Pressure Altitude in feet Execution of the program for performing the calculation set forth illuminates the program indicators at the necessary times in the following sequence: air temperature 67, pressure altitude 68 and calibrated altitude 66. The calculation is used when flying to determine the vertical distance of the aircraft above mean sea level by correcting the altimeter readings for deviations from standard conditions. The program also illustrates the ability of the program ROM to automatically enter constants into the calculations without action by the operator.

The density altitude program selector key 69 initiates a program for making the following calculation:

$$DA = 273[288 + (-.00198 \times PA)] \log \frac{273 + AT\ °C}{288 + (-.00198 \times PA)} + PA$$

where
PA = Pressure Altitude in feet
AT °C = Air Temperature in °C
DA = Density Altitude In performing the calculation, the program causes the illumination of the program indicators in the following order: air temperature 67 and pressure altitude 68. The program is used to determine the effect of non-standard atmospheric conditions on runway requirements for takeoff, the result being compared to performance charts in the aircraft owner's manual to assure there is sufficient runway for a safe takeoff.

The indicated air speed program selector key 70 initiates a program for performing the following calculation:

$$IAS = \frac{TAS}{\frac{(273 + AT\ °C)}{288} \times \frac{Ps}{Ph}^{1/2}}$$

where
IAS = Indicated Air Speed
TAS = True Air Speed
AT °C = Air Temperature in °C
PA = Pressure Altitude and $$\text{and}\quad \frac{Ps}{Ph} = \text{antilog} \frac{PA}{221.1\ [288 + (-.00099 \times PA)]}$$

The program, while performing the calculations set forth, causes the illumination of the program indicators at the proper times in the following sequence: air temperature 67, pressure altitude 68, and true air speed 64. The calculation is useful in flying in order to determine the speed at which the air speed indicator must be maintained in order to produce the desired true air speed necessary for maintaining the flight plan.

The final program selector key, the wind direction/wind velocity key 61 performs a calculation which is a variation of the true heading/ground speed calculation, and may be set forth as follows:

$$WD = \beta - \gamma + TH$$

where
WD = Wind Direction $$\gamma = \arctan \frac{TAS - GS}{TAS + GS} \tan \beta$$

TAS = True Air Speed
GS = Ground Speed
and $\beta$ is calculated from the following expression $$\left| \beta + \frac{TH - TC}{2} \right| = 90$$
$$|\beta| \leq 90$$

where
TH = True Heading
TC = True Course and $$WS = \frac{GS \sin (TH - TC)}{\sin (\beta - \gamma)}$$

Programmed computation of the calculation set forth results in the sequential illumination of the following program indicators: true heading 62, true course 58, true air speed 64 and ground speed 63. One use of the noted calculation is to compute the velocity of unknown winds in order to allow the flight service station to update their forcast.

For illustrating the operation of the computer in performing the programmed calculations, the sequence of a typical program, the true altitude problem will be set forth below. Two characteristics of each program step will be noted in adjacent columns, the actual operation performed (generally being performed by the programmed instruction with operator performed steps being noted by an asterisk) and the result accomplished by the step.

| Operation | Result |
|---|---|
| *0. Actuate true altitude program selector key. | Sets page selector and program sequence counter to first instruction of problem. |
| 1. Set ( | ( |

-continued

| Operation | Result |
| --- | --- |
| 2. Input 273 | (273 |
| 3. Set add | (273 + |
| 4. Illuminate air temperature program sequence indicator | Indicator illuminated |
| *5. Enter air temperature in °Centigrade | (273 + °C |
| 6. Set ) | Calculator performs operation within ( ) to yield result R |
| 7. Set divide | R ÷ |
| 8. Set ( | R ÷ ( |
| 9. Input constant −.0019812 | R ÷ (−0.0019812 |
| 10. Set multiply | R ÷ (−.0019812 × |
| 11. Illuminate pressure altitude indicator | Indicator illuminated |
| *12. Enter pressure altitude | Perform multiplication to result S leaving R ÷ (−S |
| 13. Set add | R ÷ (−S + |
| 14. Enter constant 288 | R ÷ (−S + 288 |
| 15. Set ) | Calculation within ( ) performed and the division then performed to yield a result Y |
| 16. Set multiply | Y × |
| 17. Illuminate calibrated altitude program sequence indicator | Indicator illuminated |
| *18. Enter calibrated altitude | Y × CA |
| 19. Set equals | Calculation performed to yield result of true altitude; true altitude displayed on numeric display. |

While the particular sequence for each program will not be specifically set forth, the illustrated program demonstrates that the program contained within the program director merely serves to "press the keys" of the computer. The illustrated program also demonstrates that the program sequence indicators are an integral part of the program and serve to guide the operator through what might otherwise be a complex manual series of operations. The simplicity from the operator's point of view is easily appreciated by reviewing the program to note the few asterisk steps indicating actual work done by the operator.

Conversion Functions

It was noted above, that in practicing the invention, the computer was adapted to perform certain conversions in order to further simplify operations. A first type of conversion allows the operator to key enter time data in mixed units of hours and minutes, and to read displayed data in the same mixed units. It will be apparent, however, that calculations and manipulations performed internally must be done in consistent units. Accordingly, the computer converts the mixed units to consistent units for performing internal calculations and manipulations, and then re-converts the consistent units to the mixed units for display. As will be apparent from the foregoing, such conversions need only be made during input and output cycles. Accordingly, the programs may contain steps to multiply the input data, and specifically the minutes portion thereof, by a constant (0.01667). In effect, during time related data entries, depression of the minute key on the keyboard serves to enter the constant into the calculator and set the multiply sign before allowing the operator to enter the number of minutes via the keyboard. Similarly, during output cycles involving such a conversion, the decimal portion of the hour must be multiplied by a constant (60) to allow the time to be displayed in hours and minutes.

A similar conversion is performed under the control of the nautical/statute switch 26. Such conversion affects both inputs and outputs involving distance (nautical miles and statute miles) and speeds (miles per hour and knots), one nautical mile being equal to 1.15078 statute miles, or one statute mile being equal to 0.86898 nautical miles. The only exception to the control of switch 26 over the units in which distances are entered into the computer is during the true heading/ground speed problem when the operator is required to enter wind speed. As wind speed is always given by the flight service station in knots, entry of this data overrides the nautical/statute switch so that wind is always entered in terms of knots irrespective of the position of the switch.

It will now be apparent that what has been provided is a computer for performing aircraft related problems which greatly simplifies the task of the pilot and allows him to maximize the attention directed toward flying the aircraft. The computer is adapted to perform programmed calculations and manipulations for solving the following problems: distance or fuel quantity, time, speed or rate, true heading and ground speed, wind direction and wind velocity, indicated air speed, density altitude, and true altitude. Additionally, the computer has the capability to perform non-programmed mathematical operations of addition, subtraction, multiplication and division. A unit conversion capability is provided for converting units of time between hours-minutes and decimal hours, and units of distance between statute and nautical miles. The numerical display is advantageously split to allow the simultaneous display of the results of dual answer problems. In addition to providing a programmed sequence for solving each of the aforementioned series of selected problems, the computer is adapted to selectively illuminate data sequence indicators so that the pilot is not only appraised that a data entry is required, but is also informed of the specific nature of the data entry needed.

We claim as our invention:

1. A self-contained hand-held electronic computer for aircraft navigational problems comprising in combination:

a housing having a storage battery power unit; a visual numerical display, a keyboard, program director means, register means for storage of data including input data and intermediate results, calculator means for performing predetermined computational functions, and interfacing circuit means for operatively connecting said keyboard, said program director means, said register means, said calculator means and said display;

said keyboard comprising a plurality of input data keys including 0 to 9 days and an enter key;

a plurality of program selector keys for at least each of the following navigational and performance problems:
1. effect of winds aloft on aircraft progress and maintenance of course,
2. effect of non-standard atmospheric conditions on aircraft performance, and a plurality of porgram selector keys for time related problems involving two entry multiplication or division functions relating the following variables:
1. time, distance and speed, and
2. time, fuel quantity and fuel consumption rate;

said program director means including pre-programmed dedicated memory means for storing programs comprising a sequence of steps including instructions to route data to and from and perform computational functions by said calculator means to solve each of the navigational, performance and time related problems within the repertoire of the computer, said instructions calling for the manual entry of data in a predetermined sequence in the course of the programs; and said interfacing circuit means including means operable in response to actuation of one of said program selector keys to initiate a selected program stored in said memory means, and pursuant to instructions from said memory means to operate said calculator means to perform computational functions on input data after entry via said input data and enter keys in the course of the selected program and on data routed from said register means, and display encoder means for receiving output data from said calculator means pursuant to instructions from said memory means and connected to show the final solution to said problems visually on the numerical display.

2. The computer as set forth in claim 1 wherein the pre-programmed dedicated memory means contains a plurality of individual program steps being stored in sequential locations in said memory, said program director further including addressing means for addressing the locations in the memory to cause the execution of the steps stored therein, and means responsive to the actuation of the program selector keys for setting the address means to address the location in which the initial step of the selected program is stored.

3. The computer as set forth in claim 2 wherein the program director means further includes sequencing means for sequencing the address means through successive program steps, said sequencing means being operative after said address means is set to the initial program step in response to the depression of a program selector key.

4. the computer as set forth in claim 1 wherein the program director means comprises a semi-conductor memory of individual bits arranged in a cubic array of multiple bit words, multiple word pages, and multiple page books, the individual steps of each program being stored as sequential words in at least one page of said array, the initial step of each program being stored as the first word of said page, selector means responsive to the depression of the program keys for selecting the page containing the program corresponding to an actuated one of the program selector keys, and sequencing means for addressing the words on a page in sequence thereby to address the steps in the stored program.

5. The computer as set forth in claim 4 wherein at least one of the programs has the program steps stored on a first and at least a subsequent page of said semi-conductor memory, said sequencing means being adapted to sequence from the last word on said first page to the first word on said subsequent page thereby to continue the program.

6. The computer as set forth in claim 1 wherein each of said navigational, performance and time related problems comprise routines of indiviidual computational steps, the program director means including means for storing in sequential locations the steps comprising each of said routines, selector means responsive to the program selector keys for addressing a first step in a selected routine, and sequencing means for addressing sequential steps in said routine thereby to perform the stored computational steps.

7. The computer as set forth in claim 6 wherein the calculator means is adapted to perform computations in response to instructions provided to said calculator means, said interfacing means including means responsive to at least a portion of the steps stored in said storage means for coupling instructions to said calculator means, thereby to effect the computations stored in said routine.

8. The computer as set forth in claim 7 further including a plurality of visual indicators, said indicators being associated with respective types of input data, said interfacing means coupling said program storage means to said indicators to illuminate individual ones of said indicators for displaying the type of data next required to be entered in said program routine.

9. The computer as set forth in claim 6 wherein at least two of the steps in said routine require the entry of numeric data via the keyboard and the remaining steps comprise internal manipulations and calculations performed upon data already entered, said program director means including means for delaying said sequencing means in response to a program step requiring input data, and means responsive to the entry of said numeric data via the keyboard for re-enabling said sequencing means to sequence to subsequent steps in said routine.

10. The computer as set forth in claim 9 further including a plurality of input data indicators, said indicators being associated with respective types of input data required to be entered in said probrams, and means coupling the program director to the indicators and operative during steps requiring the manual input of data for selectively illuminating said indicators to show the type of data required.

11. The computer as set forth in claim 6 further including memory means for storing data, predetermined ones of the steps of said routines acting through said interfacing means to cause the storage of data, predetermined ones of said steps of said routines acting through said interfacing means to cause the retrieval of said data, whereby input or calculated data required in a subsequent step of said routine may be temporarily stored until required.

12. The computer as set forth in claim 1 further including a plurality of input indicators, each of said indicators corresponding to an associated type of input data, and means responsive to the program director for energizing individual ones of the input data indicators at selected points in said program where the input data is required thereby to indicate the sequence of input data required by said program.

13. The computer as set forth in claim 1 wherein the calculating means is adapted to perform calculations under the direction of the program director means, said calculating means further including a memory for storing numbers under the direction of the program director means, the program director means being adapted to cause the temporary storage and retrieval of data thereby to decrease the number of data entries required to be performed using the 0 to 9 keys.

14. The computer as set forth in claim 1 further including memory means for storing data, and means coupling said program director means and said memory means for temporarily storing and retrieving data, thereby to reduce the number of manual data entries needed to solve said problems.

15. The computer as set forth in claim 14 wherein the memory means is adapted to store input data and calculated data under the direction of said program director means.

16. The computer as set forth in claim 1 wherein the keyboard further includes a minute key, said minute key being operative when entering by means of the 0 to 9 keys input data corresponding to time to segregate an hour's portion of the entry from a minute's portion of said entry, thereby to allow the entry of time in hours and minutes.

17. The computer as set forth in claim 16 wherein the program director means is adapted to cause time data entered in hours and minutes to be converted to consistent units for subsequent operations during the performance of said mathematical functions.

18. The computer as set forth in claim 17 wherein one or more of the problems are adapted to show the final result in units of time, the program director means being adapted to convert said consistent units into hours and minutes for display thereof.

19. The computer as set forth in claim 1 further including a selector means having a nautical position and a statute position, the position of said selector means serving to characterize the units of data entries involving distance measured in miles.

20. The computer as set forth in claim 19 wherein the program director means responds to the position of the selector means when showing a final result measured in miles to show said result in nautical or statute miles as set by said selector means.

21. The computer as set forth in claim 20 further including means responsive to the operation of said selector means for converting a displayed number between nautical and statute miles under the control of said selector means.

22. The computer as set forth in claim 1 wherein the navigational problem related to the effect of winds aloft on aircraft progress and maintenance of course comprises solution of the wind triangle problem involving the following six variables:
wind direction,
wind speed,
true course,
ground speed,
true heading, and
true air speed,
one of said program selector keys being adapted to initiate a program for calculating true heading and ground speed in response to the entry in program controlled sequence of true course, wind direction, wind velocity and true air speed.

23. The computer as set forth in claim 22 further including a nautical/statue selector for establishing the units associated with true air speed and ground speed, said program director means being adapted to accept entry of wind speed data in knots and to accept entry of true air speed and ground speed in knots or in miles per hour in dependence upon the position of the selector means and to convert said data to knots for allowing the operation on said data to perform said mathematical functions.

24. The computer as set forth in claim 1 wherein the navigational and performance problems relating to the effect of non-standard atmospheric conditions on aircraft performance includes the following calculations:
true altitude in response to the programmed sequential entry of the following data:
air temperature, pressure altitude and calibrated altitude;
density altitude in response to the program sequential entry of the following data:
air temperature and pressure altitude;
and indicated air speed in response to the sequential programmed entry of the following data:
air temperature, pressure altitude and true air speed.

25. The computer as set forth in claim 1 wherein the time related problems involving two entry multiplication or division functions include the interrelationship of the following variables:
time, distance, and speed; and
time, fuel quantity, and rate of fuel consumption;
wherein said programs solve for one of the three variables in response to the program sequential entry of the other two of said variables.

26. A hand-held self-contained electronic computer for pre-programed mathematical problems comprising in combination a housing having a storage battery power unit, a visual numerical display, a keyboard having a plurality of input keys for manual entry of numeric data, a single enter key for terminating manual entries of numeric data and a plurality of program selector keys, calculator means for performing mathematical functions and manipulations, a stored program controller, and means coupling said controller to said calculator means for causing said calculator means to perform mathematical functions and manipulations in a predetermined programed sequence, said controller having stored therein a plurality of programs for performing the mathematical problems, each of said programs comprising a routine having a sequence of program instructions, said programs being associated with and selectable by respective ones of the program selector keys, actuation of a program selector key serving to initiate the associated program, a plurality of data input indicators, said indicators being associated with individual types of data to be entered during said programs, at least two of said program steps of each program involving the manual entry of data via the keyboard, means operatively connecting said indicators to said controller and responsive to program steps involving said manual entry of data for illuminating selected ones of said indicators to show the nature of the data entry required by said program, and means for coupling the visual display to the calculator means, whereby said stored program controller causes said computer to sequentially indicate the nature of and need for a data entry and manipulate said data to calculate and display the result demanded by the actuated program selector key.

27. A hand-held self-contained electronic computer for aircraft navigational problems comprising in combination: a housing having a storage battery power unit, an operator panel including a plurality of data input keys, a plurality of program selector keys, a plurality of data entry indicators and a visual numerical display, calculator means for manipulating data and performing mathematical operations, a stored program controller, said controller having memory means programed to store a plurality of individual routines for solving aircraft related navigational and performance problems, each of said routines comprising a series of program instructions sequentially arranged in said memory means, at least some of said program instructions requiring the manual entry of data via the data input keys of said keyboard, at least some of said program instructions requiring manipulation and calculation using said data entered via the data input keys, said programs being adapted to manipulate said data to calculate results for said navigational problems, said data inut indicators being associated with respective types of input data required to be manually entered during said program instructions requiring manual entry of data via the data input keys, means coupling the program selector keys to the controller for initiating the respective programs, means coupling said controller to said calculator means for causing said calculator means to respond to said program instructions to perform the manipulations and mathematical operations upon said input data under the direction of the stored program, means coupling said data input keys to said calculator means for accepting data manually entered via the keyboard, means coupling said controller to said data entry indicators and operative in conjunction with said program instructions requiring manual entry of data for illuminating individual ones of said indicators to display to the operator the type of data required by said program step, and means responsive to said calculator means and coupled to said visual numerical display for showing the results of said problems.

28. The computer as set forth in claim 27 wherein at least some of the routines associated with said problems involve the calculation of two results, said display being split into first and second segments, said means for showing the results of said problems being adapted to display the first and second results on respective segments of said split display.

29. A hand-held self-contained electronic computer for mathematical problems comprising in combination: a housing having a storage battery power unit, an operator panel including a plurality of data input keys, a plurality of program selector keys, a plurality of data entry indicators and a visual numerical display, calculator means for performing mathematical operations, and a stored program controller, said controller having respective programs stored therein for solving a plurality of mathematical problems, each of said programs comprising a routine having a sequence of program instructions, means coupling the controller to the calculator means for causing said calculator to perform the mathematical operations indicated by said program steps, at least some of said program steps requiring the manual entry of data via the data input keys of said keyboard, means coupling said program selector keys to said controller for selecting associated ones of the programs stored in said controller, and means coupling said controller to said data entry indicators and operative in conjunction with said program instructions requiring manual entry of data for illuminating selected ones of said data entry indicators to display to the operator the type of data required by said program steps, whereby selection of a program is effective to cause said computer to demand the necessary input data in sequence, receive said data when entered and manipulate said data to calculate the desired results.

30. The computer as set forth in claim 29 wherein the program selector keys are associated with respective results desired from said mathematical problems, actuation of one of said result oriented program selector keys serving to condition the controller to demand the necessary input data and manipulate said data to calculate and display the desired result.

31. A hand-held self-powered stored program key operated electronic calculator for solving mathematical problems comprising: a housing having a storage battery power unit, an operator panel including a plurality of numeric data keys and an enter key, a plurality of program selector keys, a set of legends on the panel each identifying an item of numeric data required for solving one of said mathematical problems, data entry indicator light for each of said legends, a visual numerical display, and semi-conductor chip means mounted within said housing including, in combination:

a. a computational unit for performing computational operations for solving said problems;

b. dedicated memory means for storage of programs within the repertoire of the calculator, each of said programs comprising a routine of program steps calling for entry in a programmed sequence of items of numeric data identified by said legends and for performance by said computational unit of selected mathematical operations on entered items of numeric data, c. register means for temporary storage of numeric data and intermediate results;

d. keyboard decoder means for decoding numeric data input via said data keys and programs designated via said program selector keys;

e. display encoder means connecting the output from said computational unit to said display;

f. an interface and circuit means between the computational unit, memory means, register means, decoder and encoder means to control the computational unit to perform computations based on the data in said register and received from said numeric data keyboard decoder means persuant to a program selected by manual operation of one of said program selector keys; and g. means operatively connecting said memory means and data indicator lights to light one of said indicator lights pursuant to a step of a selected program and to advance the program to the next step after entry of the item of numeric data called for by the lighted indicator light, said combination providing means for initiation of a stored program to solve a mathematical problem by manual operation of one of said program selector keys, means operative when a numeric data entry is required at any step of a program to indicate the nature of such entry, which prompts the operator to enter the required numeric data in the required sequence, and means for operating on the entered data and computing and displaying the solution to the mathematical problem.

\* \* \* \* \*